US008055209B1

(12) United States Patent
Dao

(10) Patent No.: US 8,055,209 B1
(45) Date of Patent: Nov. 8, 2011

(54) MULTI-BAND PORTABLE SATCOM ANTENNA WITH INTEGRAL DIPLEXER

(75) Inventor: Thach Kim Dao, Fountain Valley, CA (US)

(73) Assignee: Muos Labs, Irving, CA (US)

( * ) Notice: Subject to any disclaimer, the term of this patent is extended or adjusted under 35 U.S.C. 154(b) by 116 days.

(21) Appl. No.: 12/460,468

(22) Filed: Jul. 20, 2009

(51) Int. Cl.
*H04B 1/44* (2006.01)

(52) U.S. Cl. ......... 455/78; 455/552.1; 455/83; 455/66.1

(58) Field of Classification Search .................... 455/78, 455/13.3, 19, 66.1, 63.4, 82, 83, 277.1, 344, 455/552.1, 553.1, 25; 343/850, 781 P, 779; 333/126, 129, 132
See application file for complete search history.

(56) References Cited

U.S. PATENT DOCUMENTS

| | | | | |
|---|---|---|---|---|
| 3,579,244 | A | 5/1971 | Dempsey et al. | |
| 4,689,627 | A | 8/1987 | Lee et al. | |
| 5,898,406 | A | 4/1999 | Matero | |
| 7,019,708 | B2 | 3/2006 | Regala | |
| 7,098,862 | B2 * | 8/2006 | Regala | 343/850 |
| 2003/0184487 | A1 * | 10/2003 | Desargant et al. | 343/781 P |
| 2003/0201939 | A1 | 10/2003 | Reece et al. | |
| 2005/0264449 | A1 * | 12/2005 | Strickland | 343/700 MS |
| 2009/0207764 | A1 * | 8/2009 | Fukamachi et al. | 370/297 |

* cited by examiner

*Primary Examiner* — John J Lee
(74) *Attorney, Agent, or Firm* — William L. Chapin

(57) ABSTRACT

A man-pack portable, multi-band ultra-high frequency turnstile-type SATCOM radio antenna for transmitting and receiving radio signals between terrestrial locations and an orbiting earth satellite includes a cylindrically shaped antenna superstructure base which has an elongated mast extending forward from a front transverse end wall of the base, and circumferentially spaced apart pairs of radiating elements which extend radially outwards from the mast, each opposed pair comprising in combination an electric dipole antenna which is electrically connected via coaxial cables disposed longitudinally through the mast to zero and ninety degree ports of a hybrid antenna matching network located in the base and having an input port electrically connected to a coaxial antenna base connector located in a rear transverse end wall of the base. A diplexer which includes a cylindrical housing longitudinally alignable with the base contains a low-frequency band-pass filter and a high-frequency band-pass filter having low and high center frequencies, respectively, the filters having a common output node electrically connected to coaxial diplexer output connector located on a front transverse end wall of the diplexer housing and longitudinally engageable with the antenna base connector. The diplexer has on a rear transverse end wall thereof two coaxial transceiver connectors connected to separate nodes of the high and low frequency filters, the transceiver connectors being connectable via coaxial cables to one or more radio transceivers, which are thus enabled to operate simultaneously in different frequency bands, without requiring any external diplexer.

22 Claims, 20 Drawing Sheets

*TEST SET-UP FOR 360-380 MHz VSWR PLOT*

DIPLEXER

TEST SET-UP FOR 240-318 AND 360-380 MHz ISOLATION PLOT 240-318, 360-380 MHz ISOLATION

TEST SET-UP FOR 240-318 MHz VSWR PLOT 240-318 MHz VSWR

TEST SET-UP FOR 360-380 MHz VSWR PLOT 360-380 MHz VSWR

MULTI-BAND PORTABLE SATCOM ANTENNA WITH INTEGRAL DIPLEXER

BACKGROUND OF THE INVENTION

A. Field of the Invention

The present invention relates to portable antennas for transmitting and receiving ultra-high frequency radio signals. More particularly, the invention relates to a compact, manpack-portable, foldable multi-band antenna which has an integral diplexer that eliminates the requirements for transporting heavy, bulky external diplexer boxes along with the antenna when an operator in the field needs to communicate in different frequency bands with a satellite.

B. Description of Background Art

Governmental agencies such as U.S. military services that utilize personnel operating in remote field locations have a need for instantaneous, reliable communication systems. Such systems are required for conveying data between personnel in field locations and fixed command and control sites. As a practical matter, communication systems which meet the various requirements for reliable communications of the type alluded to above generally utilize radio transceivers. Thus the U.S. military services and other governmental agencies typically use small, portable radio transceivers for communications amongst remote field locations, as well as between these remote field locations and command and control sites. Such transceivers usually operate at a relatively low power level of 20 watts or less. To achieve long distance communication capability, and to avoid line-of-sight signal transmission obstructions such as mountainous terrain, portable communication transceivers used for applications such as those described above often utilize a transponder located in an earth orbiting satellite, and are hence used in communication systems referred to as SATCOM systems.

Portable radio transceivers of the type described above must of course use an antenna to transmit and receive radio signals through space. Thus portable military where line-of-sight communications are not feasible often utilize transmissions between an orbiting earth satellite to provide the needed range and terrain obstruction avoidance. For such applications, a small manpack-transportable, SATCOM antenna operable in ultra-high frequency (UHF) radio bands is frequently used.

Manpack-transportable SATCOM antennas currently in use are required to have a reasonably high gain in UHF radio bands located generally between about 225 MHZ and 400 MHZ. Such SATCOM antennas generally have a "turnstile" type external appearance, or "form factor", which includes a central straight, longitudinally disposed mast that has 4-radiating elements protruding radially outwards. These elements are spaced circumferentially apart at 90-degree intervals. One pair of diametrically opposed elements comprises an electric dipole antenna that is electrically connected to a first port of a hybrid antenna coupler network. The second pair of elements oriented at 90-degrees to the first pair comprises a second electric dipole antenna, and is connected to a second port of the antenna coupler network, which is shifted in phase 90 degrees from the first port by circuitry in the hybrid matching network. This arrangement results in the transmission of a circularly polarized signal. The arrangement also enables the antenna to receive at relatively high gains signals of various polarizations.

Satellite antennas of the type described above usually have reflector elements in addition to radiating elements. These typically consist of a plurality of four or more conductive rods which extend perpendicularly outwards from the antenna mast, in a plane located below the plane of the radiating elements. The reflector elements are effective in increasing the gain and directivity of the antenna both for transmitting and receiving signals.

Typical SATCOM antennas also have one or more planes of four radially disposed "parasitic" elements located in longitudinally spaced apart locations above the radiating elements. The function of the parasitic elements is to guide radio-frequency waves emitted from or received by the radiating elements to be more generally aligned with the longitudinal axis of the mast, thus increasing the gain and directivity of the antenna.

Radio communication systems using SATCOM antennas of the type described above usually are required to operate in a full duplex mode, in which signals are transmitted from and received by the antenna simultaneously. As can be readily appreciated, transmitted signals having typical power levels of tens of watts would completely overload if not destroy receiver circuitry with sufficient gain and sensitivity to process received signals having typical levels of micro watts. Therefore, full duplex operation of a SATCOM transceiver/antenna system requires an electrical isolation network to isolate transmitted, "up-link" signals in a first frequency range from received, "down-link" signals in a second frequency range. Such networks, which must be capable of handling the maximum transmitted power levels that an antenna is intended to handle, are called diplexers. Because of their power handling requirements, the diplexer circuitry must be relatively robust, and is thus usually contained in a separate box or case which is connected by flexible coaxial cables between the antenna and one or more transceivers.

The requirement for separate external diplexers imposed by prior-art portable SATCOM antennas operated in a full duplex mode places an additional burden on a soldier or other field operator, because of the additional bulk and weight of the external diplexer and cables required to interface the diplexer between a transceiver and a SATCOM antenna. Consequently, it would be desirable to eliminate the requirement for an external diplexer, The present invention was conceived in part to fulfill the need for a manpack portable SATCOM antenna operable simultaneously in different frequency bands without requiring an external diplexer.

OBJECTS OF THE INVENTION

An object of the present invention is to provide a multi-band manpack-portable ultra-high frequency SATCOM radio antenna which includes an integral diplexer that facilitates operation of the antenna in different frequency bands.

Another object of the invention is to provide a foldable, manpack-portable multi-band UHF antenna which includes an integral diplexer unit contained within a housing extending conformally from the base of the antenna to thus substantially maintain the size, weight, and form factor of antennas for similar applications that require an external diplexer box.

Another object of the invention is to provide an improvement in manpack portable UHF antennas in which a housing containing an integral diplexer and conformally attachable to the base of the antenna enables multi-band operation off the antenna without the requirement for an external diplexer box.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, I do not intend that the scope of my exclusive rights and privileges in the invention be limited to details of the embodiments described. I do intend that equivalents, adaptations and modifications of the invention reasonably inferable from the description contained herein be included within the scope of the invention as defined by the appended claims.

SUMMARY OF THE INVENTION

Briefly stated, the present invention comprehends an improved man-pack portable ultra-high frequency (UHF) radio antenna for use in transmitting and receiving radio signals between terrestrial locations, and for satellite communications (SATCOM) between terrestrial locations and an earth-orbiting satellite. According to the invention, a foldable, manpack-portable multi-band SATCOM antenna has an integral diplexer which facilitates simultaneous operation of the antenna in different frequency bands. Thus, the antenna according to the present invention enables radio transceivers to be connected directly to the antenna and simultaneously transmit signals at high power levels in two different frequency bands, or transmit high-power signals in a first, up-link frequency band while simultaneously receiving low-power signals in a second, down-link frequency band According to the invention, the integral diplexer is contained in a cylindrically shaped housing which mounts conformally to the cylindrically shaped base of a foldable, man-pack portable turnstile type SATCOM antenna. Thus the antenna according to the present invention eliminates the requirements for an external diplexer and interconnecting cables typically required for full-duplex operation of portable radio transceivers in different frequency bands, while retaining a similar form factor and a size only slightly larger than that of prior portable SATCOM antennas.

DESCRIPTION OF THE PREFERRED EMBODIMENTS

Figure 1:
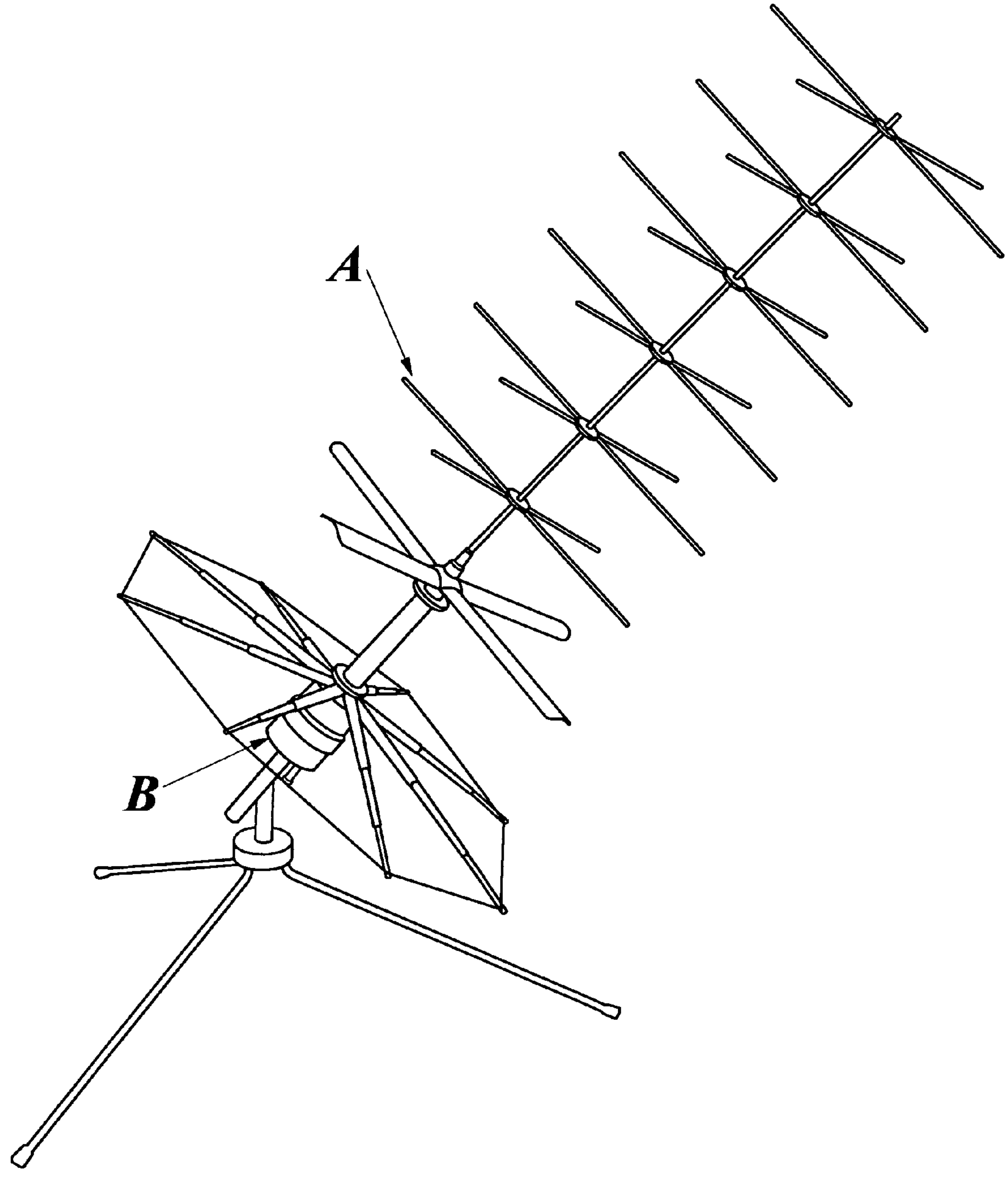
FIG. 1 (PRIOR ART)
FIG. 1 is a perspective view of a prior art portable SATCOM antenna.

FIG. 1 illustrates a prior art manpack-portable UHF SATCOM antenna A. FIGS. 2-16 illustrate a multi-band portable SATCOM antenna with integral diplexer according to the present invention.

Figure 2:
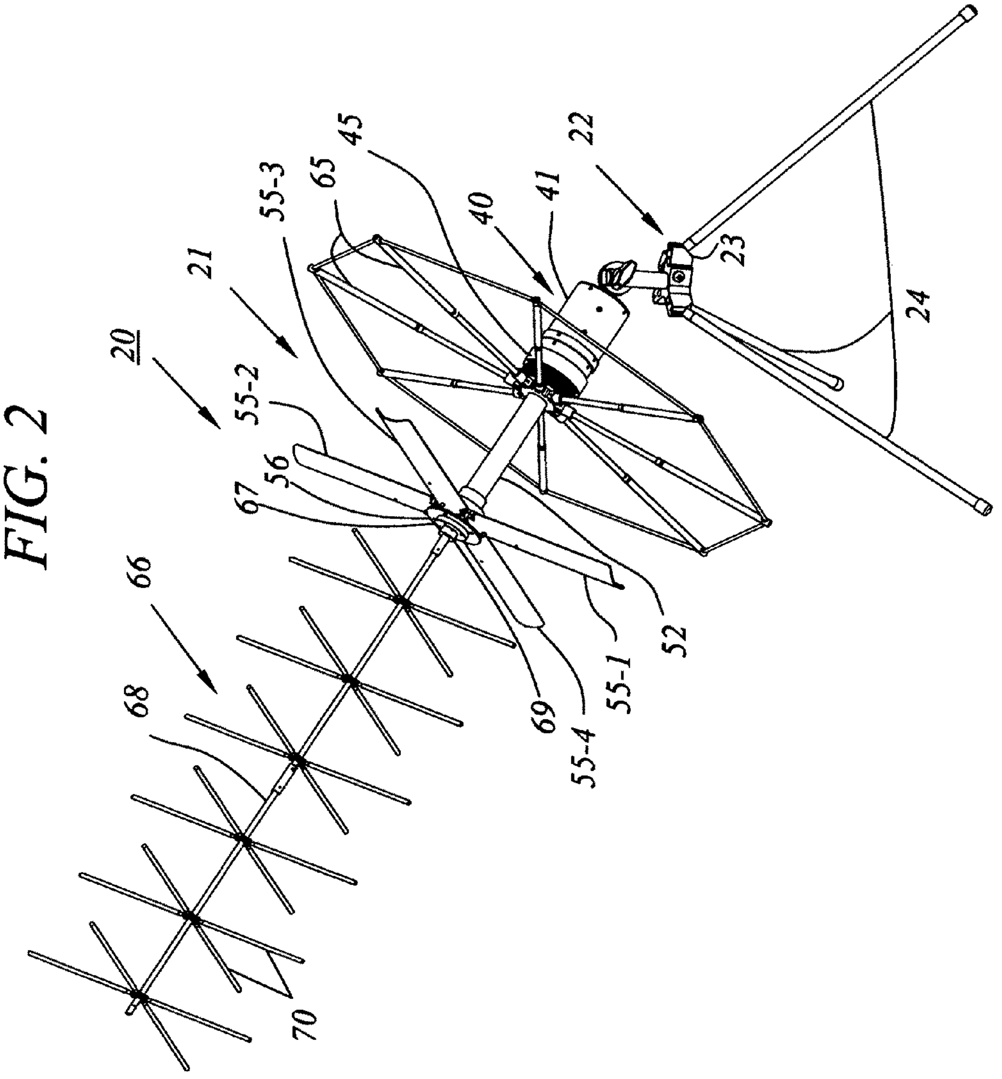
FIG. 2 is a perspective view of a multi-band portable SATCOM antenna with integral diplexer according to the present invention.
Figure 2A:
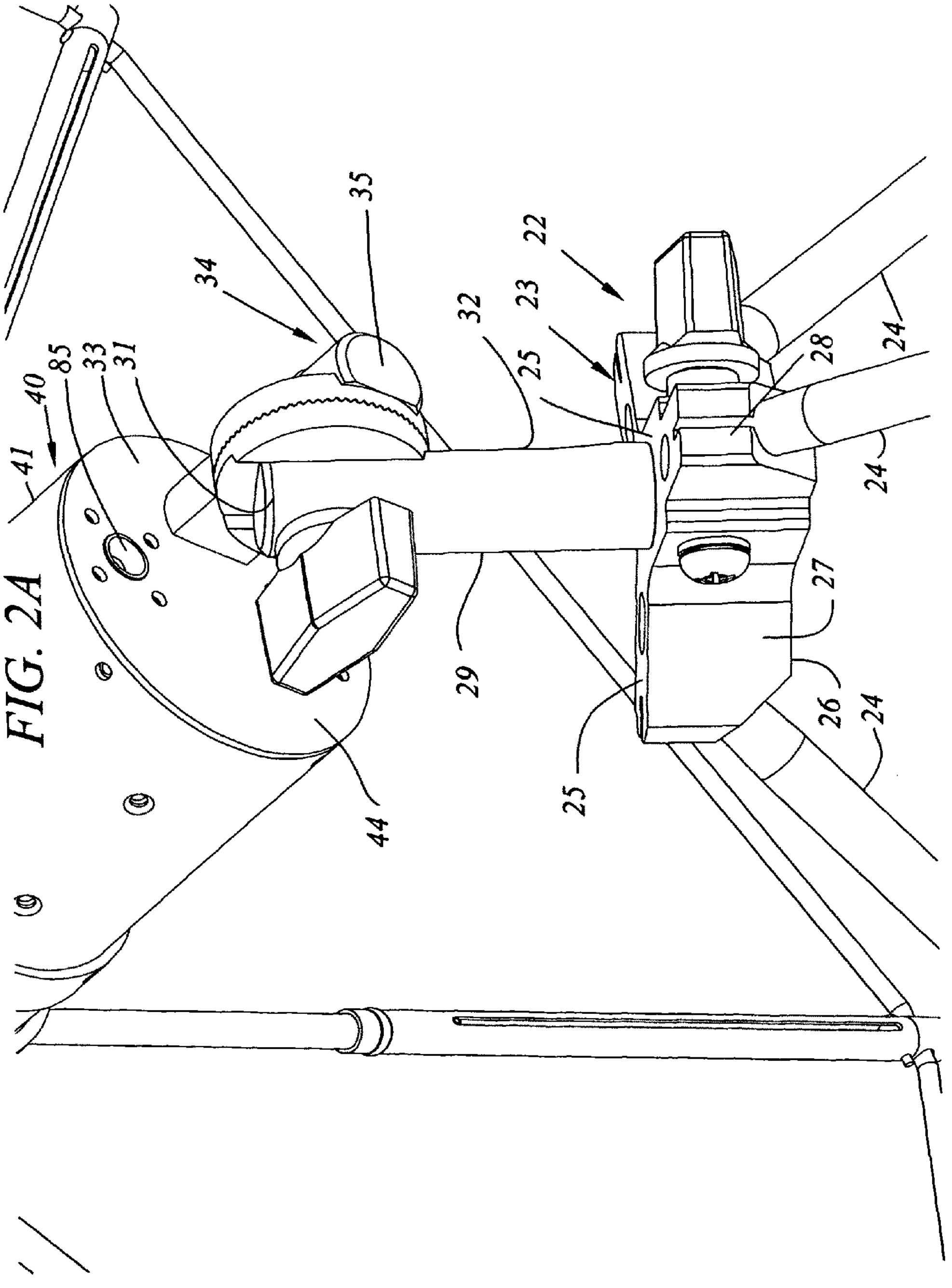
FIG. 2A is a fragmentary rear perspective view of the antenna of FIG. 2, on an enlarged scale.
Figure 2B:
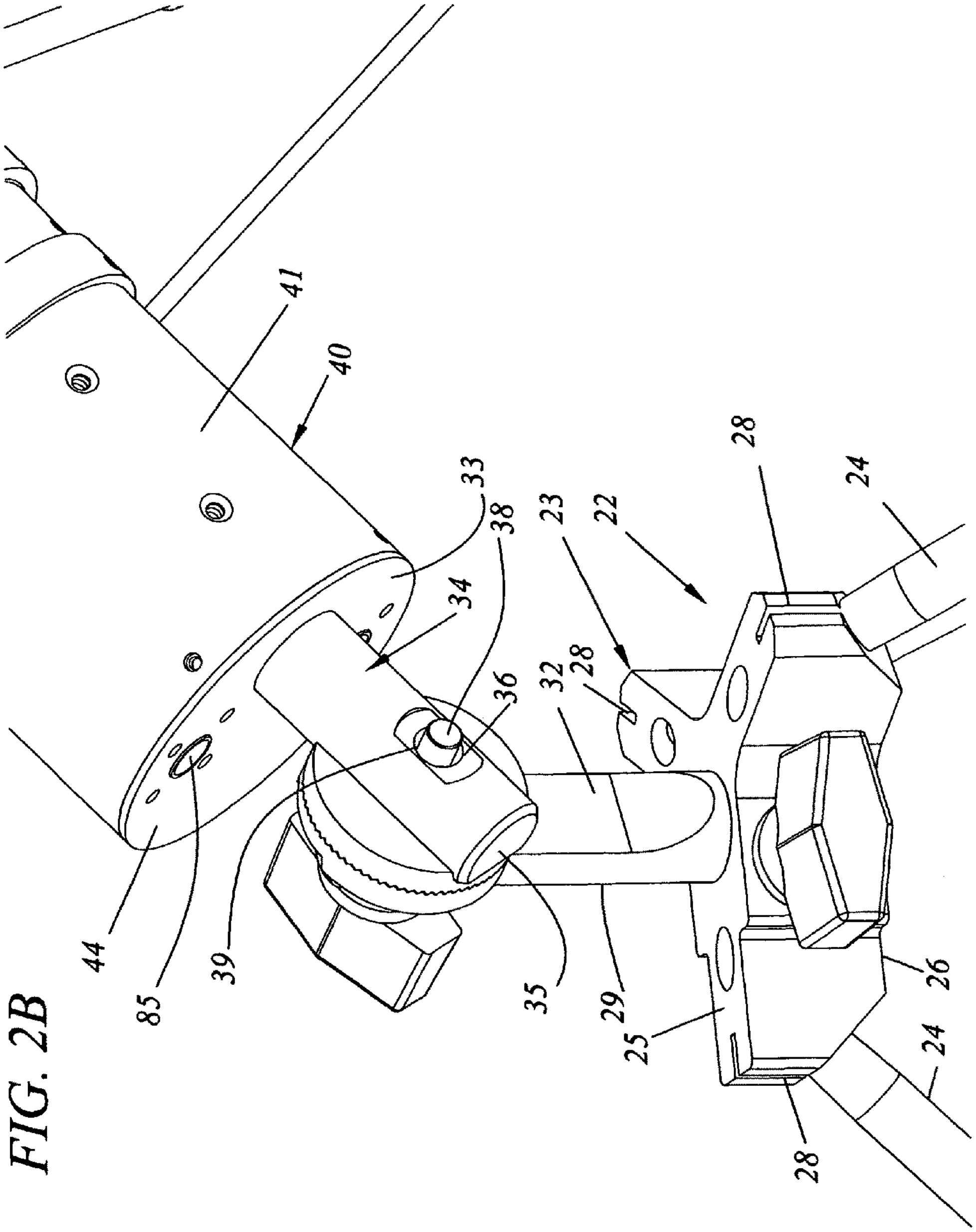
FIG. 2B is a fragmentary oblique perspective view of the antenna of FIG. 2, on a further enlarged scale.
Figure 2C:
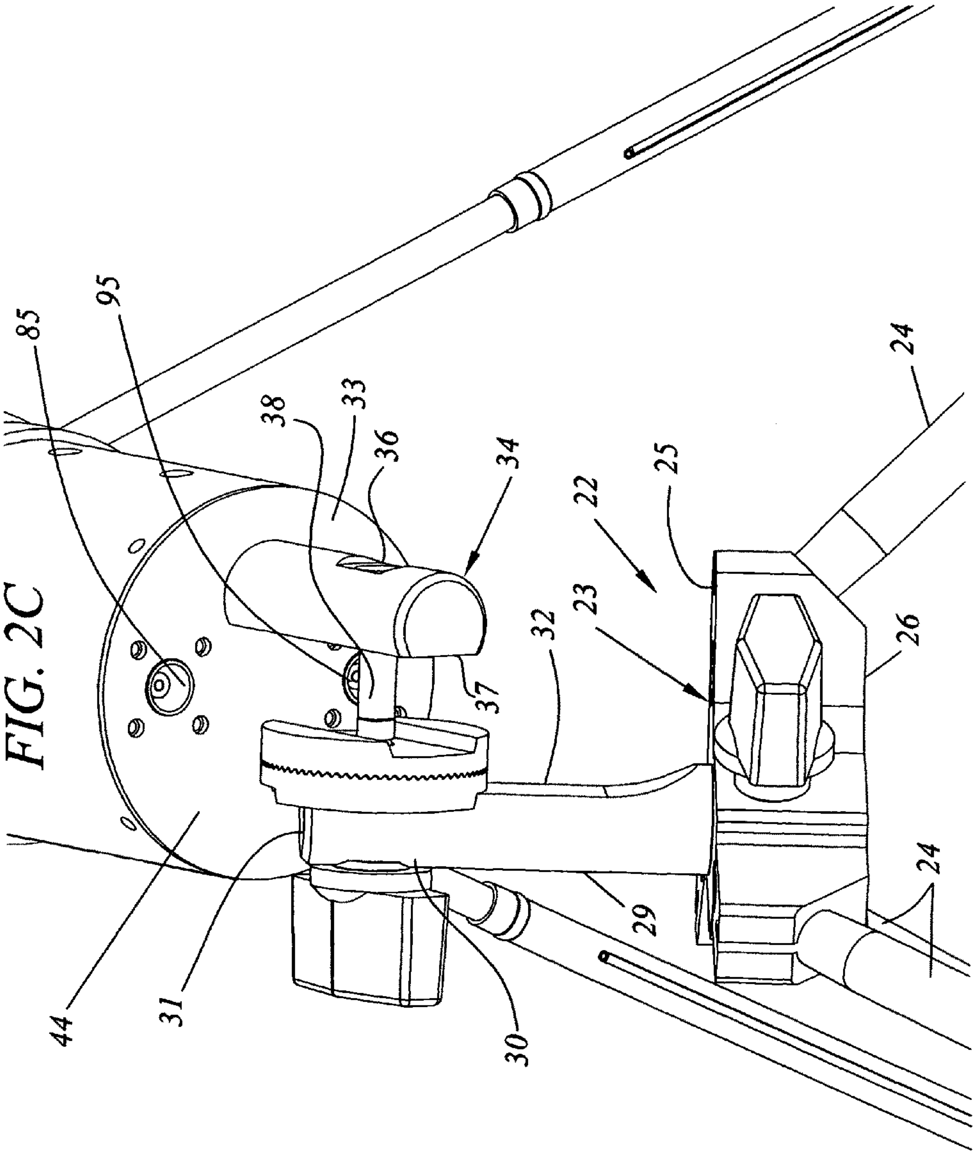
FIG. 2C is a partly exploded rear perspective view of the antenna of FIG. 2.

Referring first to FIG. 2, it may be seen that a multi-band portable antenna 20 according to the present invention includes an antenna superstructure 21 which is supported at adjustable elevation angles by a tripod 22. Tripod 22 includes a table 23 supported by three tripod legs 24. As shown in FIGS. 2A-2C, the table 23 has generally a polygonal outline with flat and parallel upper and lower surfaces 25, 26. Table 23 has formed in the vertical peripheral wall surface 27 thereof three radially inwardly extending grooves 28 which penetrate lower surface 26 of the table. The three grooves 28 are spaced circumferentially apart at 120-degree intervals. Each groove 28 pivotably retains therein a separate tripod leg, and has therein a detent mechanism which enables the legs to be fixed in a downwardly and outwardly use configuration, as shown in FIG. 2, and pivoted to a more compact configuration for stowage and transportation.

As shown in FIGS. 2-2C, tripod 22 includes a short semi-cylindrically shaped support standard 29 which protrudes vertically upwards from the center of upper surface 25 of tripod table 23. Standard 29 has extending transversely through its thickness a transversely disposed circular cross-section hole 30. Hole 30 is located a short distance below upper transverse end face 31 of support standard 29. As shown in FIGS. 2A-2C, semi-cylindrically shaped support standard 29 has a longitudinally disposed, vertically oriented flat face 32. As is also shown in those figures, antenna superstructure 21 has protruding perpendicularly rearwards from a rear transverse face 33 thereof a semi-cylindrically shaped support boss 34. Support boss 34 has located a short distance inwards of a rear transverse end face 35 thereof a horizontally disposed bore 36. Also, support boss 34 has a flat, longitudinally disposed face 37.

Antenna superstructure 21 is detachably mounted to tripod 22 by first placing the flat longitudinally disposed face 37 of the superstructure support boss 34 in parallel contact with flat vertical wall surface 32 of support standard 29. Bore 36 through support boss 34 is then coaxially aligned with hole 30 through support standard 29. A threaded bolt or screw 38 is then inserted through hole 30 through support standard 29 and through bore 36 through support boss 34, and a locking nut 39 is then threadably tightened onto the screw, thus securing the antenna superstructure 21 at an adjustable elevation angle relative to tripod 22.

Referring to FIGS. 2-7, it may be seen that superstructure 21 of antenna 20 includes a cylindrically shaped diplexer unit 40 which has a longitudinally elongated, cylindrically shaped housing 41. Housing 41 has a thin, uniform wall thickness cylindrically shaped shell 42, a front circular disk-shaped bulkhead or end plate 43 disposed transversely to the longitudinal center line of the shell, and a rear transversely disposed, circular disk-shaped bulkhead or end plate 44. Superstructure support boss 34 protrudes rearwardly from the rear transverse face 33 of rear end plate 44.

As shown in FIGS. 3A-6, diplexer 40 is so constructed as to fit in conformal coaxial alignment to the rearside of a short, cylindrically shaped antenna superstructure base 45. As may be understood by referring to FIG. 1 in addition to FIGS. 3A-6, antenna superstructure base is similar in size and shape to the base B of a typical prior art SATCOM antenna A. However, base 45 of antenna 20 is modified by the addition of a cylindrically shaped coupler flange ring 46 which is circumferentially attached to the outer cylindrical wall surface 47 of base 45. Coupler flange ring 46 extends rearwardly from a rear circular disk-shaped end plate 48 of base 45, and has an inner diameter of an appropriate size to insertably receive in a snug fit a front end portion of diplexer housing 41.

Diplexer housing 41 is fastened to coupler flange ring 46 of antenna superstructure base 45 by circumferentially spaced apart screws 49 inserted through clearance holes 50 disposed radially through the flange ring, and threadably tightened into aligned threaded bores 51 in the outer cylindrical wall surface of diplexer housing 41.

Figure 3A:
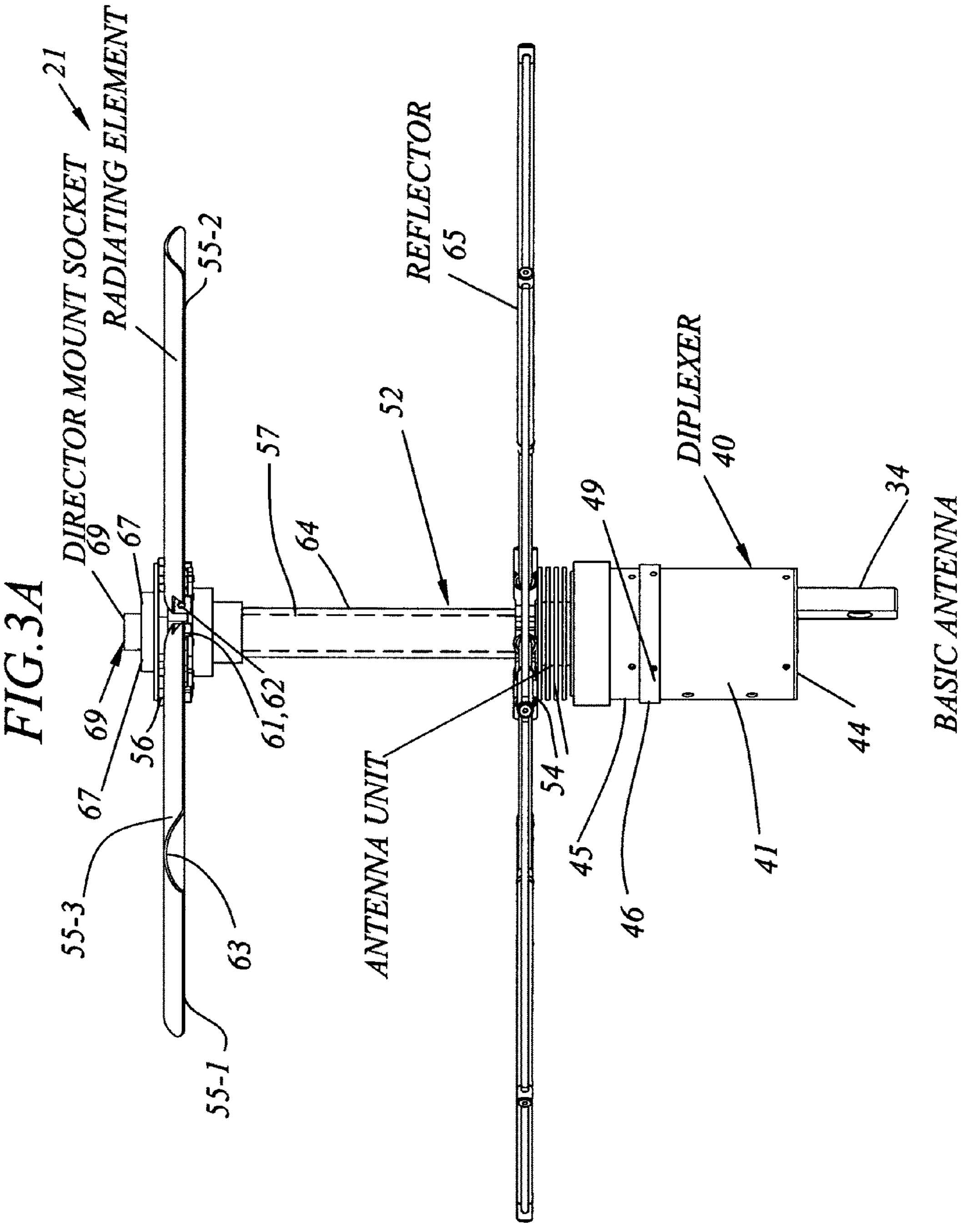
FIG. 3A is a fragmentary side elevation view of the antenna of FIG. 2.
Figure 4:
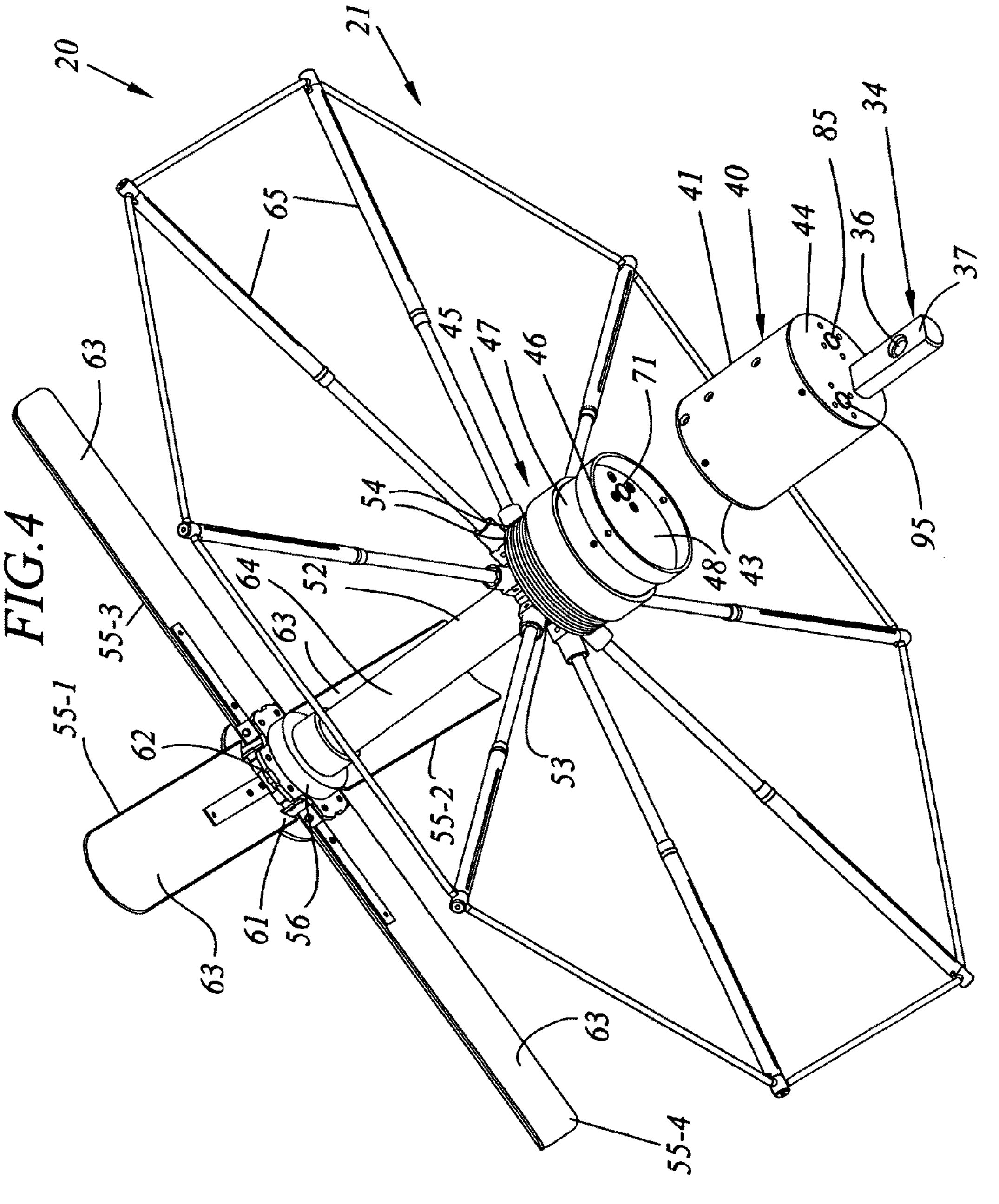
FIG. 4 is an exploded perspective view of the fragmentary structure shown in FIG. 3A.

As shown in FIGS. 3A and 4, antenna 20 includes a longitudinally elongated, hollow tubular base mast 52 which protrudes forward from a front transversely disposed circular end wall 53 of antenna superstructure base 45. Base mast 52 is coaxially aligned with the front circular end wall 53, and has at a rear end thereof a stack of longitudinally spaced apart, coaxially encircling washer-shaped heat sink plates 54.

Referring to FIGS. 3A-4, it may be seen that antenna 20 includes electrically conductive radiating elements 55 for transmitting and receiving radio-frequency waves. Radiating elements 55 have the shape of thin, longitudinally elongated, rectangular plates which are curved downwards along a longitudinal axis of the plate. The plates are located in a plane disposed transversely to the front end of base mast 52, and protrude radially outwards from a central, circular ring-shaped insulating hub 56 which fit coaxially over a front end portion of the mast.

The radiating elements 55 are arranged as two pairs of diametrically opposed plates, one pair being circumferentially spaced 90 degrees apart from the other pair. Each diametrically opposed pair of plates 55 comprises in combination an electrical dipole antenna. As may be understood by referring to FIG. 8, each dipole is connected by conductors such as a coaxial cable disposed through a hollow bore 57 through base mast 51 to a hybrid antenna matching network 58 located inside base 44. One pair of radiating plates 55 is connected to a first, 0-degree-phase port consisting of high potential terminal 59 and a ground terminal of the hybrid network 58. The other, quadrature pair of radiating plates 55 is connected to a second, 90-degree phase port of hybrid network 58, the second port consisting of second high-potential terminal 60 which is shifted in electrical phase by 90 degrees from the first terminal, and the ground terminal of the hybrid network. This arrangement causes signals transmitted by radiating elements 55 to be circularly polarized, and enables signals of various polarizations to be received with satisfactory gain.

As shown in FIG. 4, radially inwardly located transverse ends 61 of radiating plates 55 are pivotably attached to hub 56 by transversely disposed pivot pins 62. This construction enables the plates 55 to be folded downwardly to thus position the lower concave faces 63 of the plates towards the outer cylindrical wall surface 64 of base mast 51, thus compacting the antenna for stowage and transport.

Hub 56 preferably has detent mechanisms (not shown) which includes springs which retain radiating elements 55 in radially outwardly extending orientations when the elements are pivoted upwards from a stowage and transport configuration to an operational configuration as shown in FIG. 4.

As shown in FIGS. 2-4, antenna 20 includes a plurality of electrically conductive or dielectric reflector rods 65 which extend radially outwards from antenna base mast 51, near the rear end of the base mast. The reflector rods 65, which are preferably pivotably mounted to base mast 51 to facilitate folding the rods towards the mast for stowage and transport, increase the gain and directivity of antenna 20.

As shown in FIG. 2, superstructure 21 of antenna 20 also preferably includes a director structure 66 which extends forward from the front transverse end wall 67 of radiating element hub 56. Director structure 66 includes a mast consisting of an elongated straight insulating rod 68, the rear end of which is removably insertable into a resilient socket 69 centrally located in front end wall 67 of hub 56.

Mast 68 has protruding radially outwards therefrom in each one of a plurality of transversely disposed, longitudinally spaced apart planes four thin, electrically conductive director rods 70. which are spaced circumferentially apart at 90-degree intervals. The director rods 70 in each plane are longitudinally aligned with radiating elements 55, and increase the gain and directivity of antenna 20.

FIGS. 5-9 illustrate in more detail certain novel and advantageous features of antenna 20 over prior art antennas of the type shown in FIG. 1.

Figure 5:
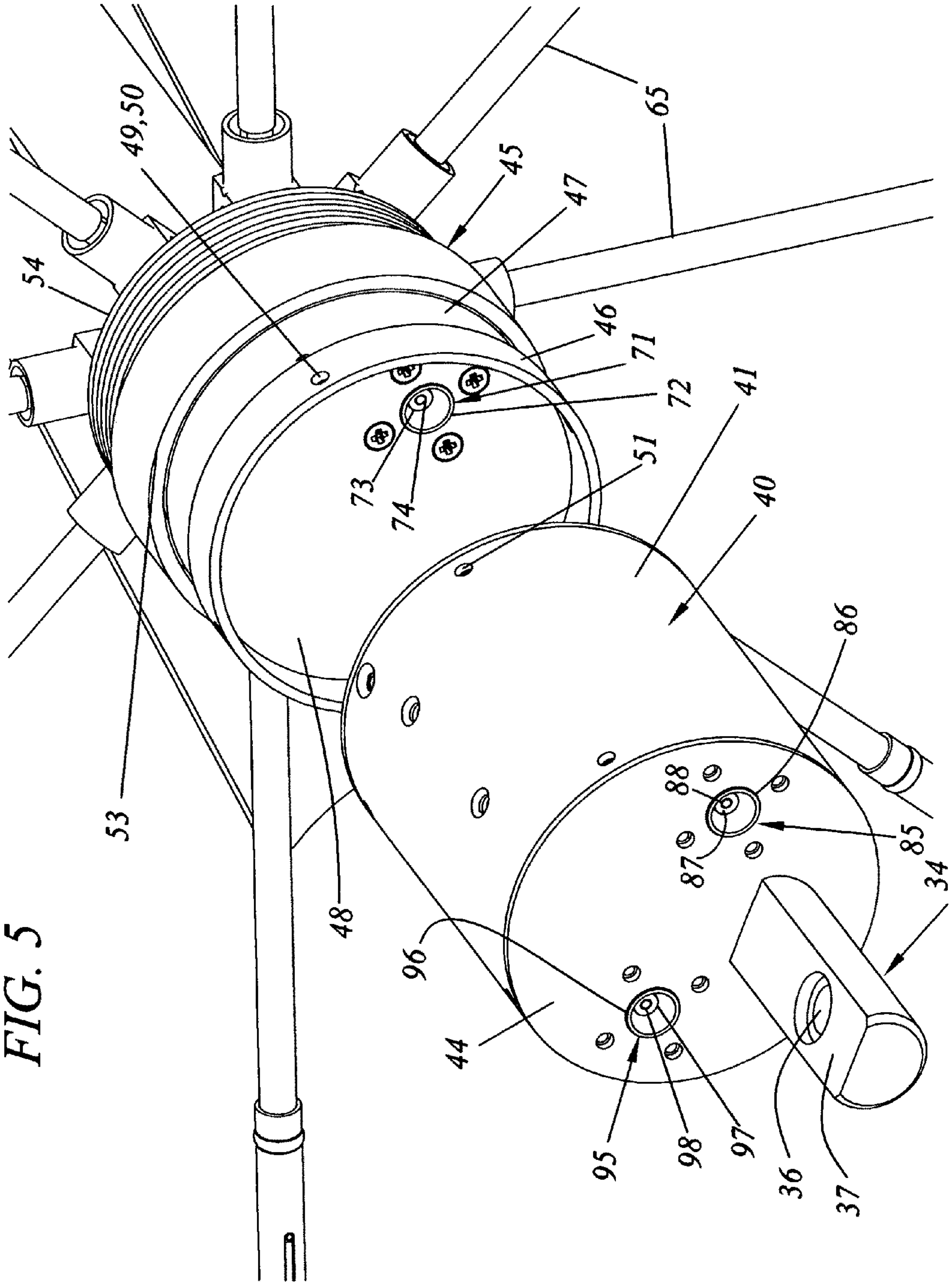
FIG. 5 is a fragmentary rear perspective view of the structure of FIG. 4, on an enlarged scale.
Figure 8:
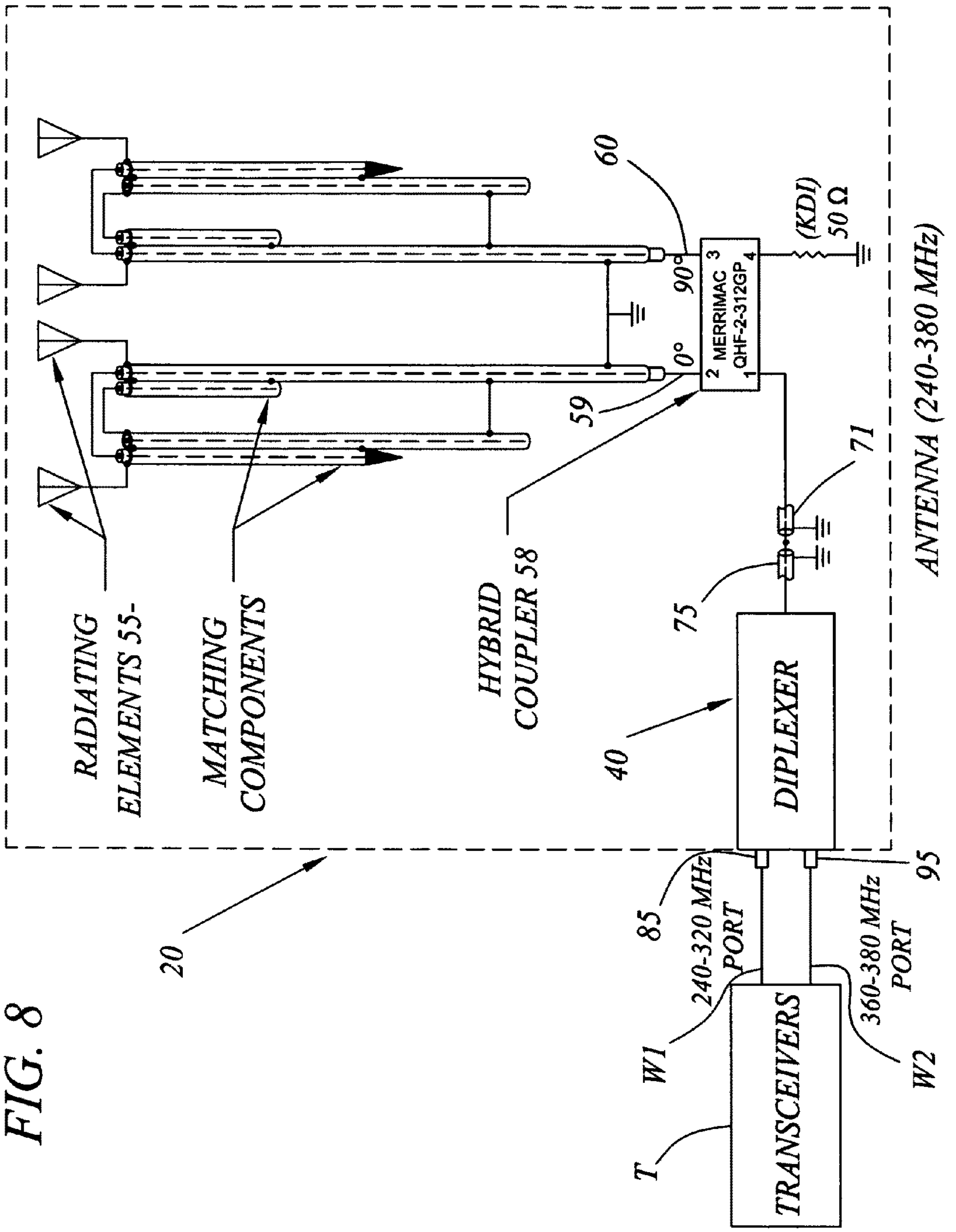
FIG. 8 is a partly schematic block diagram of the antenna of FIG. 2.

Referring to FIG. 5, it may be seen that antenna superstructure base 45 has inset into the rear circular end plate or bulkhead 48 thereof a first, female type coaxial electrical connector 71. Connector 71, which is mounted flush with the rear transversely disposed surface of bulkhead 48, includes an electrically conductive shell 72, a flat circular inner end wall 73 made of an insulating material, and a conductive pin 74 that is coaxially located within the shell and protrudes outward from the end wall. Antenna base coaxial connector 71 is electrically conductively connected to hybrid antenna matching network 58, as shown in FIG. 8, and thus comprises an antenna base port connector.

Figure 3B:
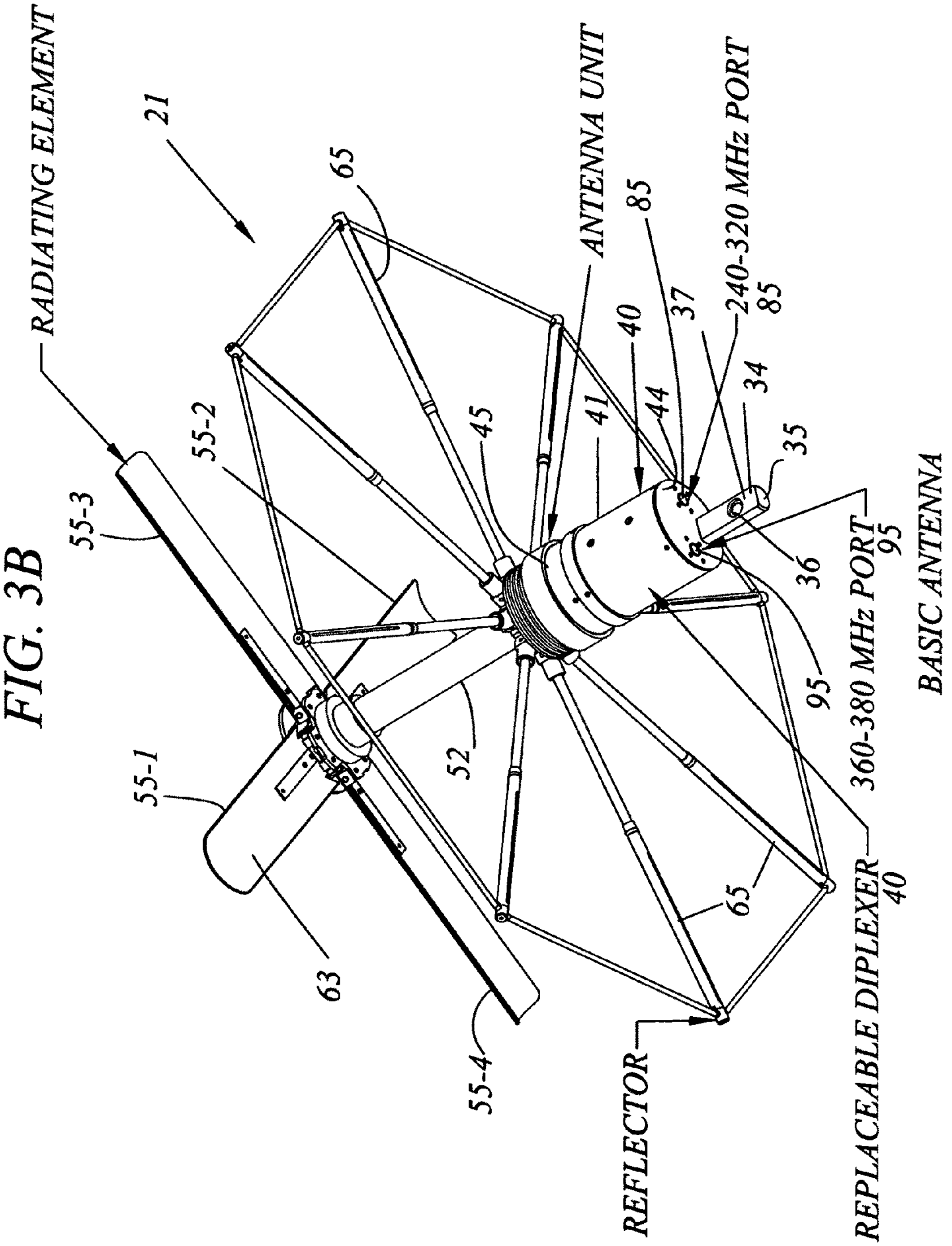
FIG. 3B is a perspective view of the structure of FIG. 3A
Figure 6:
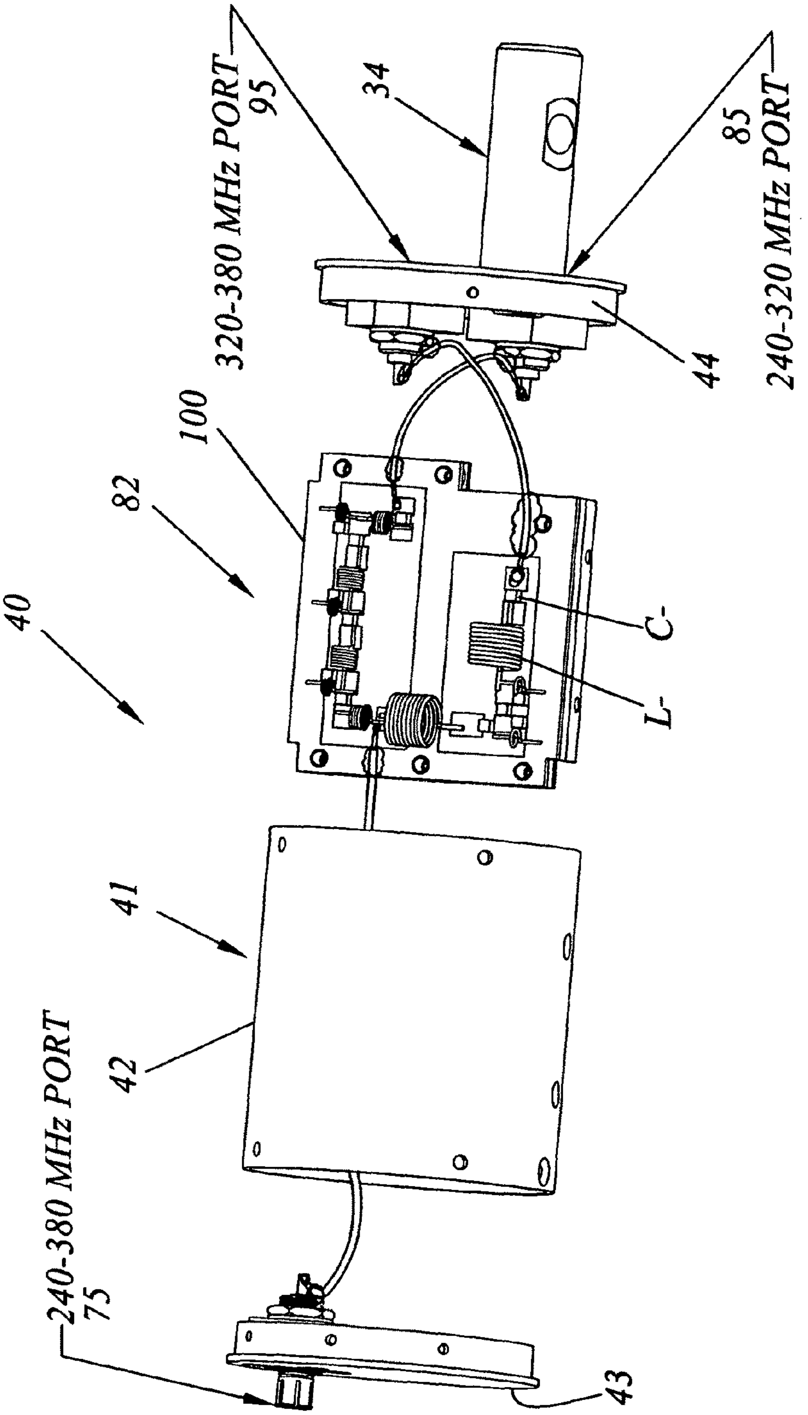
FIG. 6 is an exploded side elevation view of a diplexer component of the structure of FIG. 5.
Figure 7:
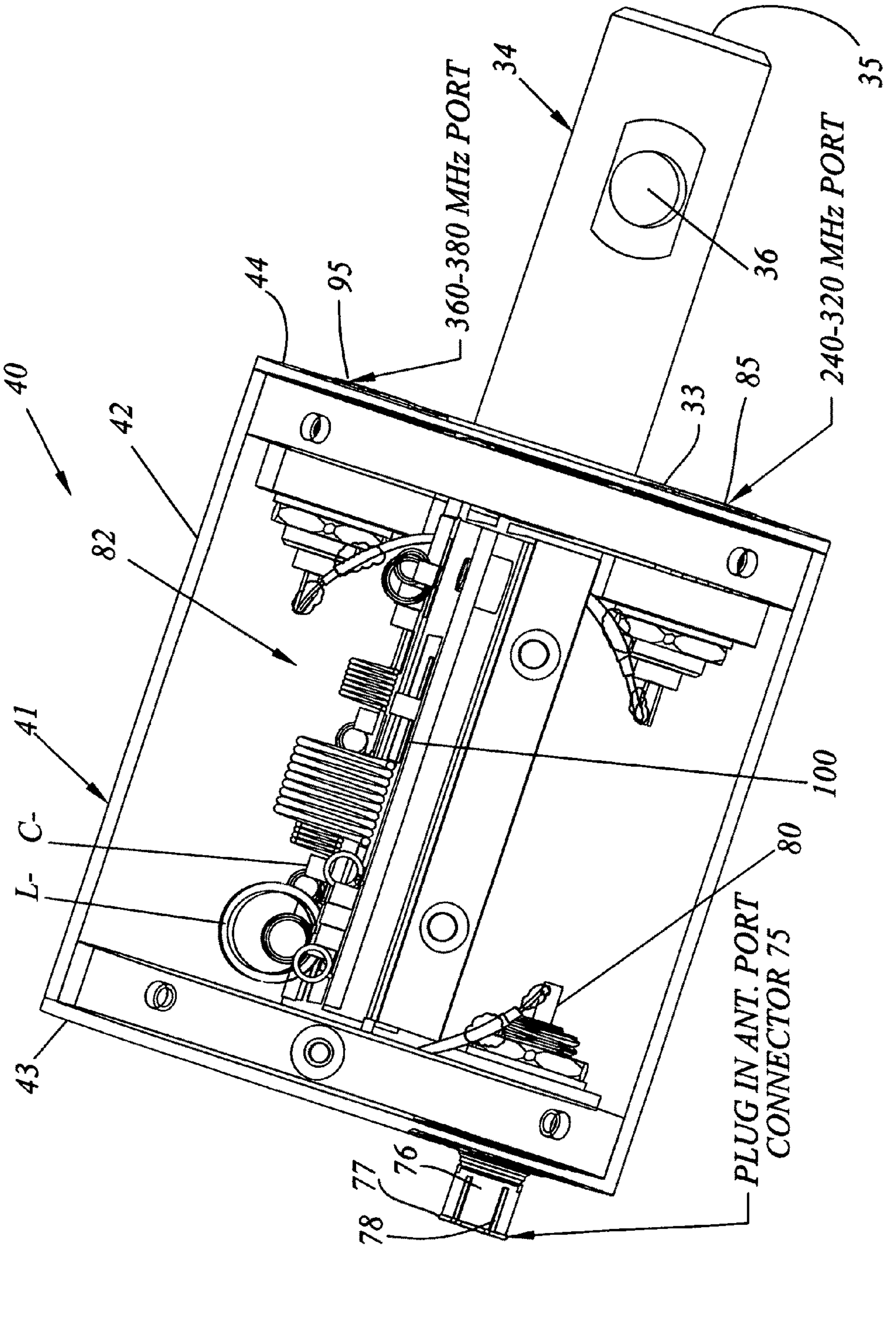
FIG. 7 is a broken-away side elevation view of the diplexer unit of FIG. 6, showing the diplexer rotated 90 degrees about a longitudinal axis of the antenna mast, with part of the diplexer case removed.

As may be understood by referring to FIGS. 6 and 7 in addition to FIG. 5, antenna base connector 71 is adapted to insertably receive a diplexer output coaxial connector 75 which protrudes forward from front end plate 43 of diplexer housing 41, when the diplexer housing is mechanically coupled to antenna superstructure base 45, as shown in FIGS. 2, 3A and 3B. As shown in FIGS. 6 and 7, diplexer output coaxial connector 75 is a second, male type which is adapted to mate with first, female type connector 71. Thus diplexer output coaxial connector 75 includes a cylindrically shaped tubular shell 76 which protrudes forward from front end wall 43 of diplexer housing 41. Shell 76 is made of a springy, elastically deformable metal and has extending longitudinally rearwardly from front annular end wall 77 thereof a plurality of longitudinally disposed, circumferentially spaced apart slots 78. This construction facilitates resilient insertion of connector 75 into concave shell 72 of antenna base connector 71.

Connector 75 includes at a rear, inner end thereof an inner transversely disposed insulating end wall 79, which has protruding forward therefrom, a coaxially centrally located, resiliently deformable conductive ferrule 80 which is adapted to insertably and resiliently receive conductor pin 74 of connector 71.

Figure 9:
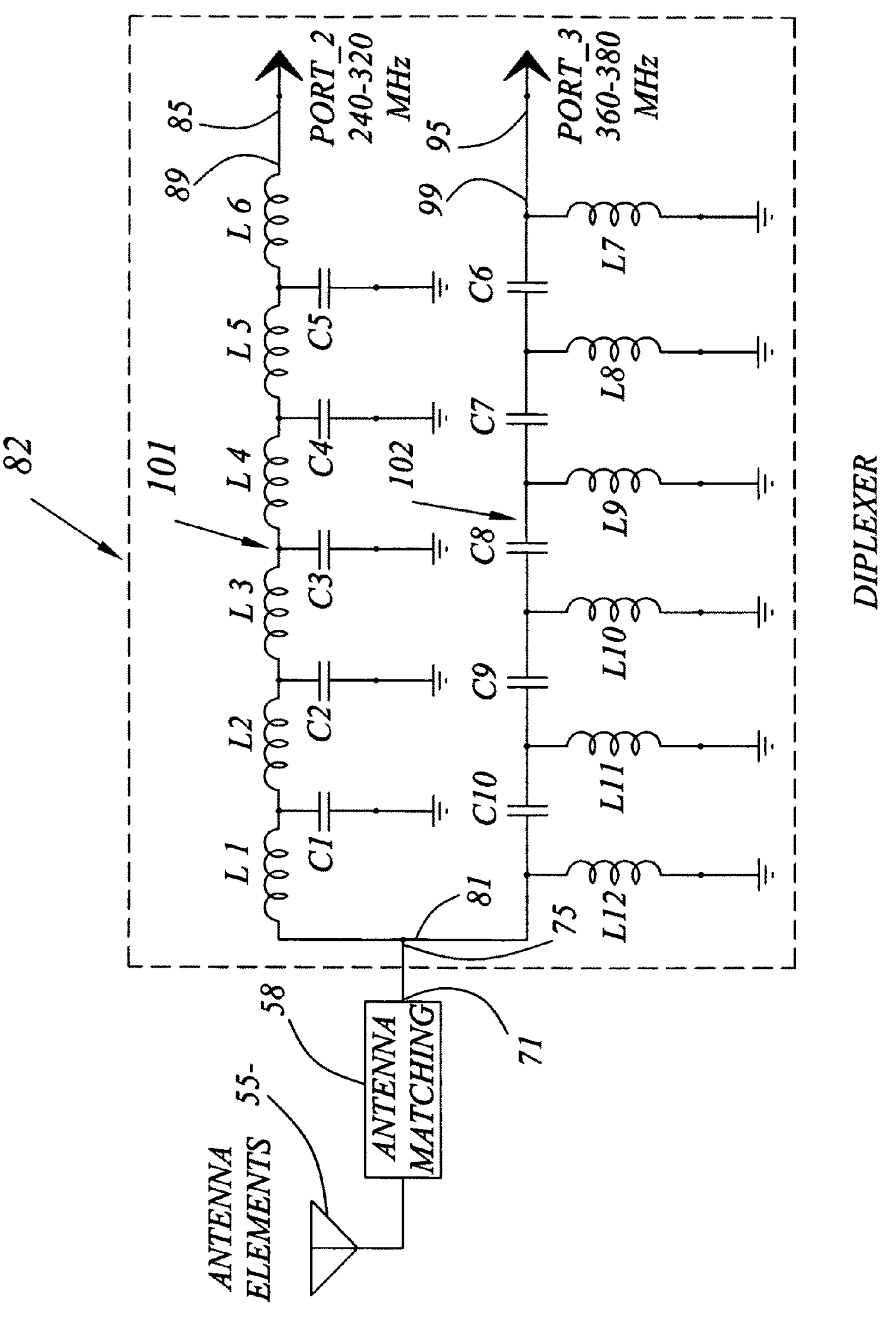
FIG. 9 is an electrical schematic diagram of the antenna of FIG. 2.
Figure 10:
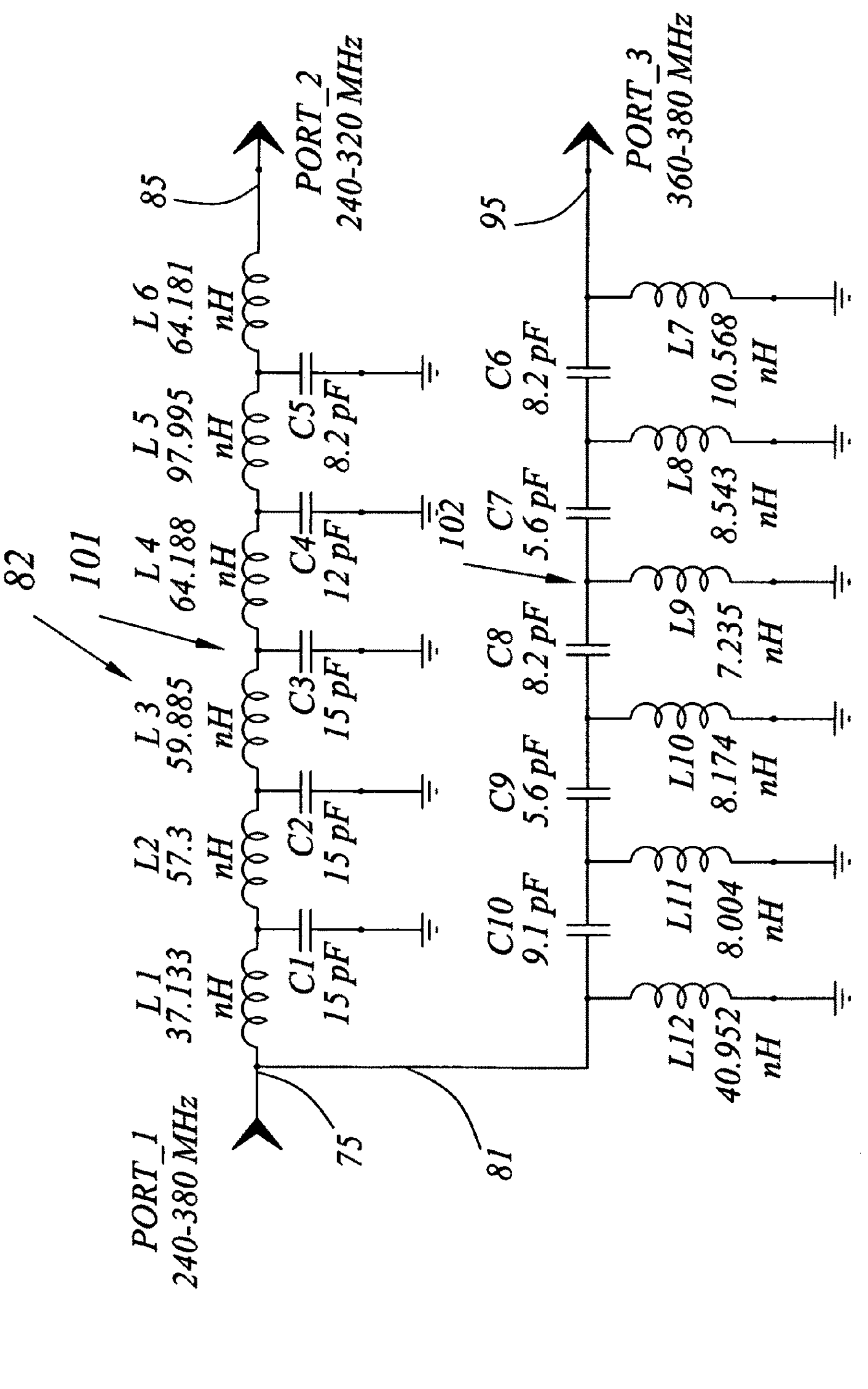
FIG. 10 is an electrical schematic diagram of the diplexer component of the antenna of FIG. 2.

As shown in FIGS. 9-10, connector 75 is electrically connected to a common high-potential terminal 81 of a diplexer circuitry 82, and thus comprises a multi-band antenna interface port connector when connected to antenna base connector 71.

As is also shown in FIGS. 5-8, diplexer 40 has a first, low-frequency-band port which includes a female coaxial connector 85 that is inset into the rear end plate 44 of diplexer housing 41. Connector 85 is exactly similar in construction to antenna base connector 71 described above and thus has a concave conductive shell 86, an inner transversely disposed end wall 87, and an outwardly extending central coaxial connector pin 88. Connector pin 88 is electrically connected to a low-frequency node 89 of diplexer circuitry 82.

Referring still to FIGS. 5-8, diplexer 40 has a second, high-frequency band port which includes a female coaxial connector 95 that is exactly similar in construction to low-frequency-band diplexer connector 85 described above. Thus high-frequency band connector 95 has a concave conductive shell 96, an inner transversely disposed end wall 97, and an outwardly extending central coaxial connector pin 98. Connector pin 98 is electrically connected to a high-frequency node 99 of diplexer circuitry 82.

Referring to FIGS. 6,7,9 and 10, it may be seen that diplexer circuitry 82 includes capacitors C and inductors L which are mounted on a printed circuit board 100 and electrically interconnected to thus form two separate band-pass filters, i.e., a first, low-frequency band-pass filter 101 having a pass-band of, for example, 240 MHZ to 320 MHZ, and a second, high-frequency band-pass filter 102 having a pass-band of, for example, 360 Hz to 380 MHZ.

As shown in FIG. 8, antenna 20, when configured for operation to transmit and receive radio-frequency communications, has high-frequency port connector 85 and low-frequency port connector 95 connected via coaxial cables W1, W2 to one or more radio transceivers T. Notably, the operation of antenna 20 with one or more transceivers T does not require the use of external diplexer(s) and associated cables, as required for operation of a prior art antenna of the type shown in FIG. 1.

As shown in FIG. 8, a first radially opposed pair of radiating plates 55-1, 55-2 comprising in combination a first, 0-degree dipole antenna is electrically conductively connected to a first, 0-degree phase output port consisting of a terminal 59 and a common ground of hybrid matching network 58. A second pair of radially opposed radiating plates 55-3,55-4 comprising in combination a second, 90-degree dipole antenna is electrically conductively connected to a second, 90-degree phase shifted port consisting of terminal 60 and the common ground of hybrid matching network 58.

Figure 11:
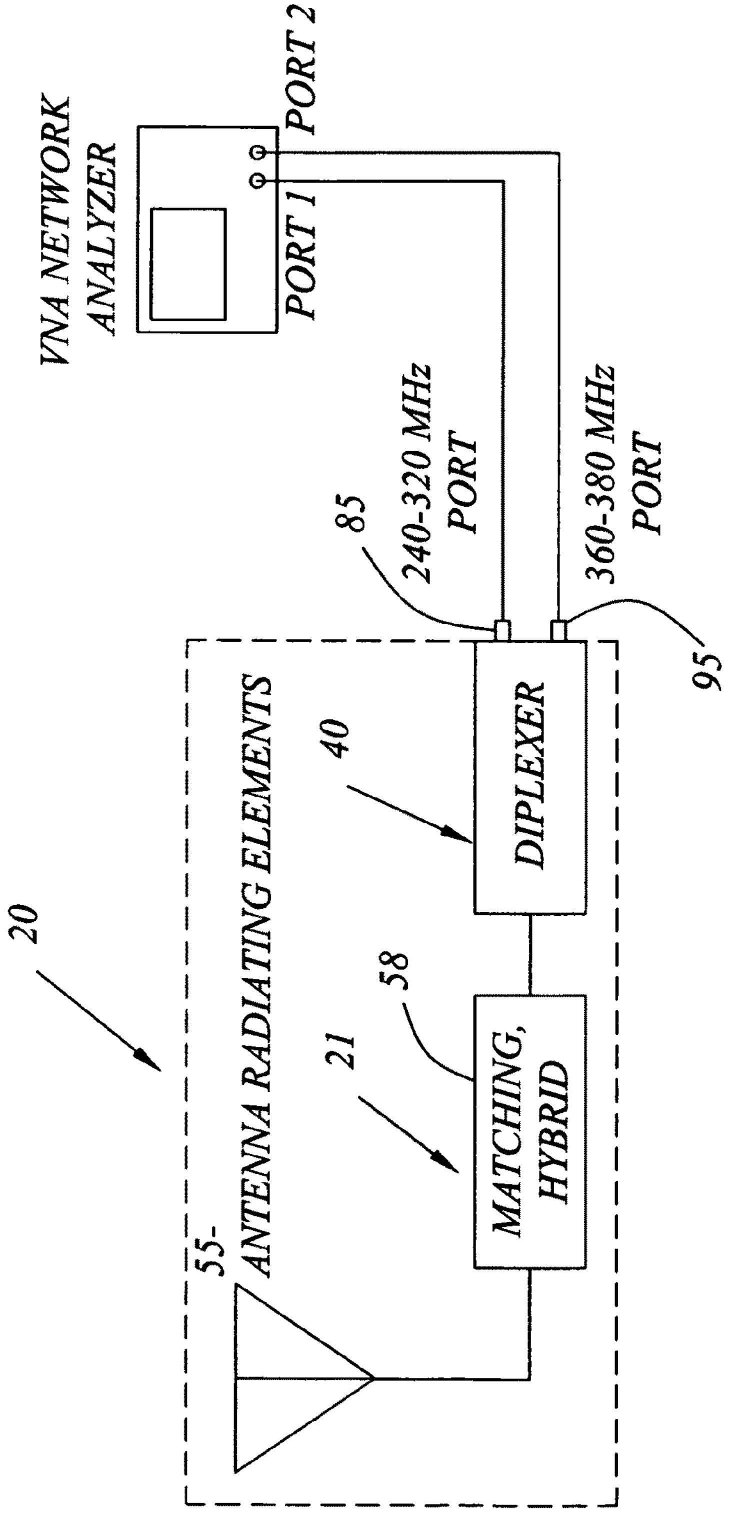
FIG. 11 is a block diagram showing a test set-up used to measure frequency band isolation obtained by the antenna of FIG. 2.
Figure 12:
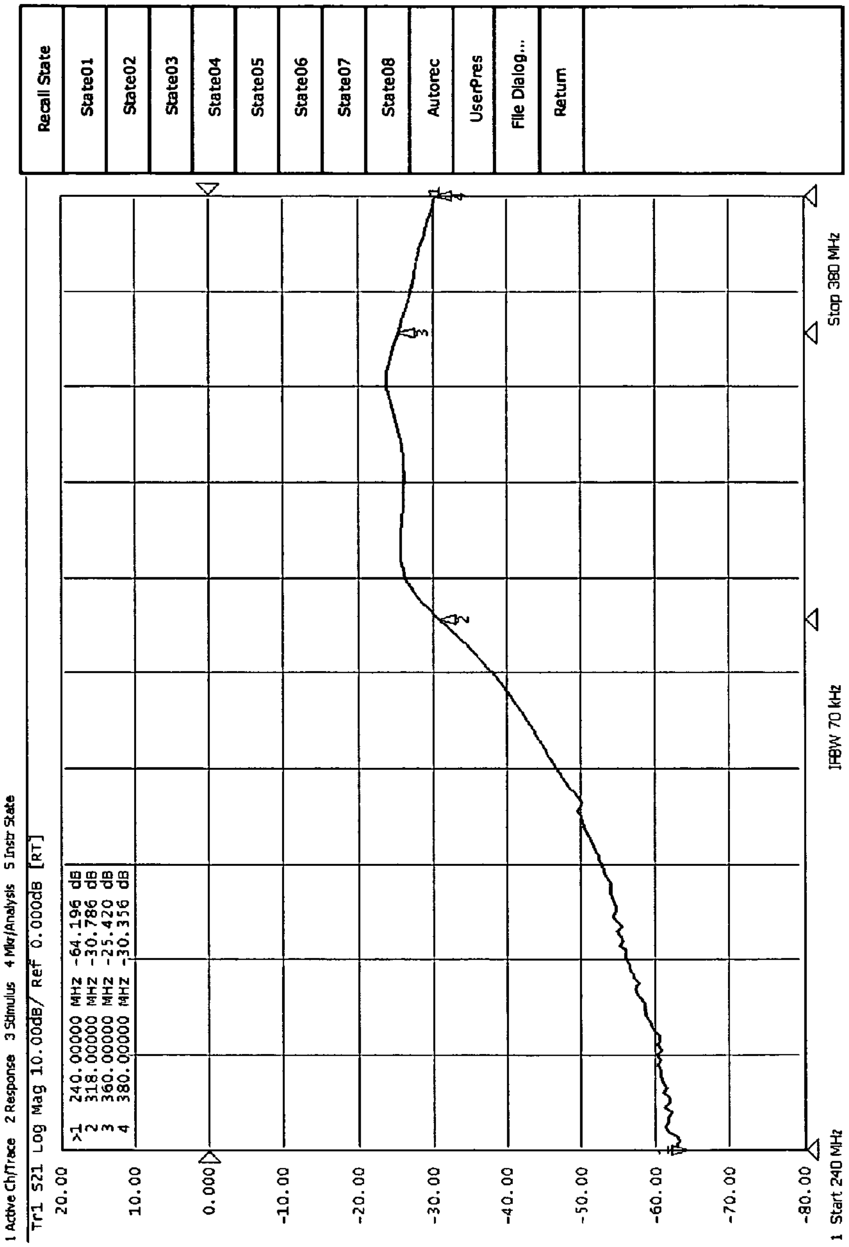
FIG. 12 is a graph showing a plot of isolation versus frequency obtained by the antenna of FIG. 2, measured as shown in FIG. 11.

FIG. 11 illustrates a test set-up for measuring as a function of frequency isolation between signals on high-frequency port connector 95 and low-frequency port connector 85 of antenna 20. FIG. 12 shows a plot of the isolation of antenna 20, as measured using the set-up of FIG. 11.

Figure 13:
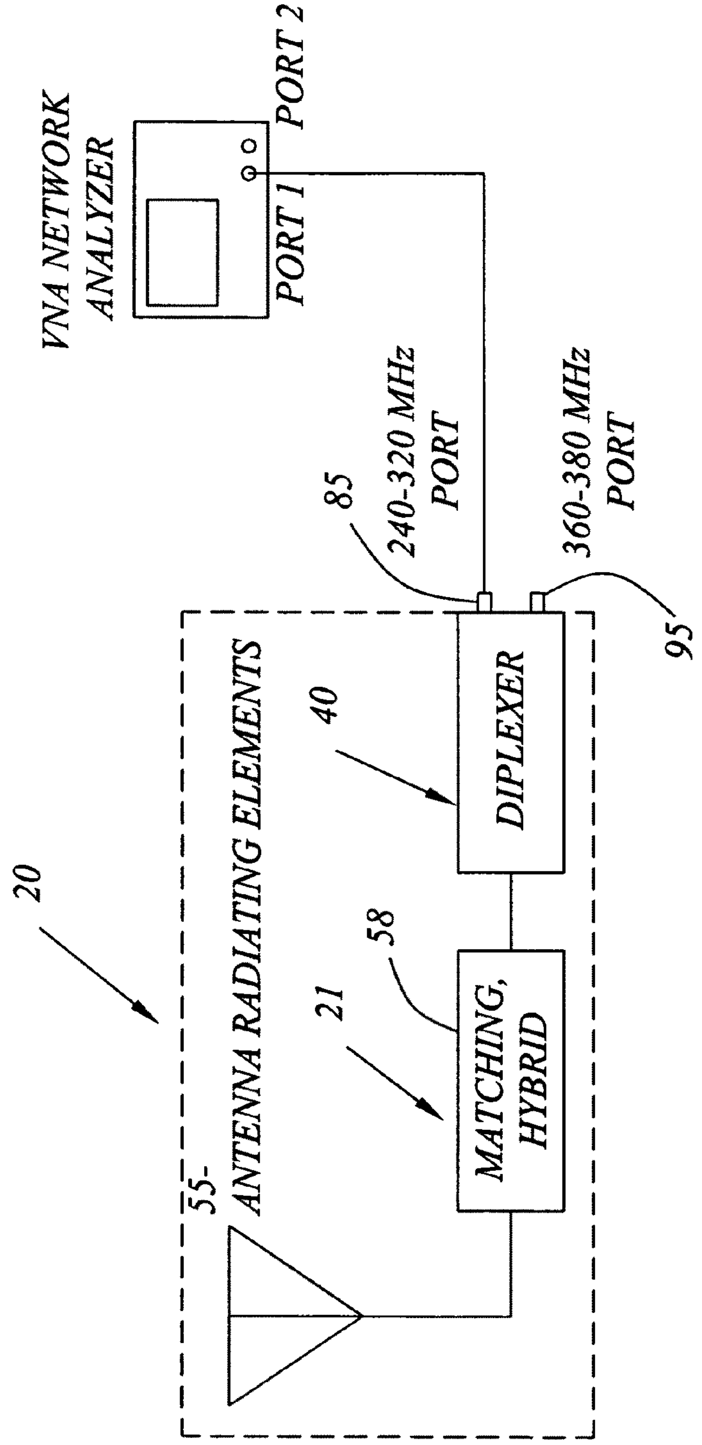
FIG. 13 is a block diagram showing a test set-up used to measure Voltage Standing Wave Ratio (VSWR) of the antenna of FIG. 2, for a frequency band of 240-318 megahertz.
Figure 14:
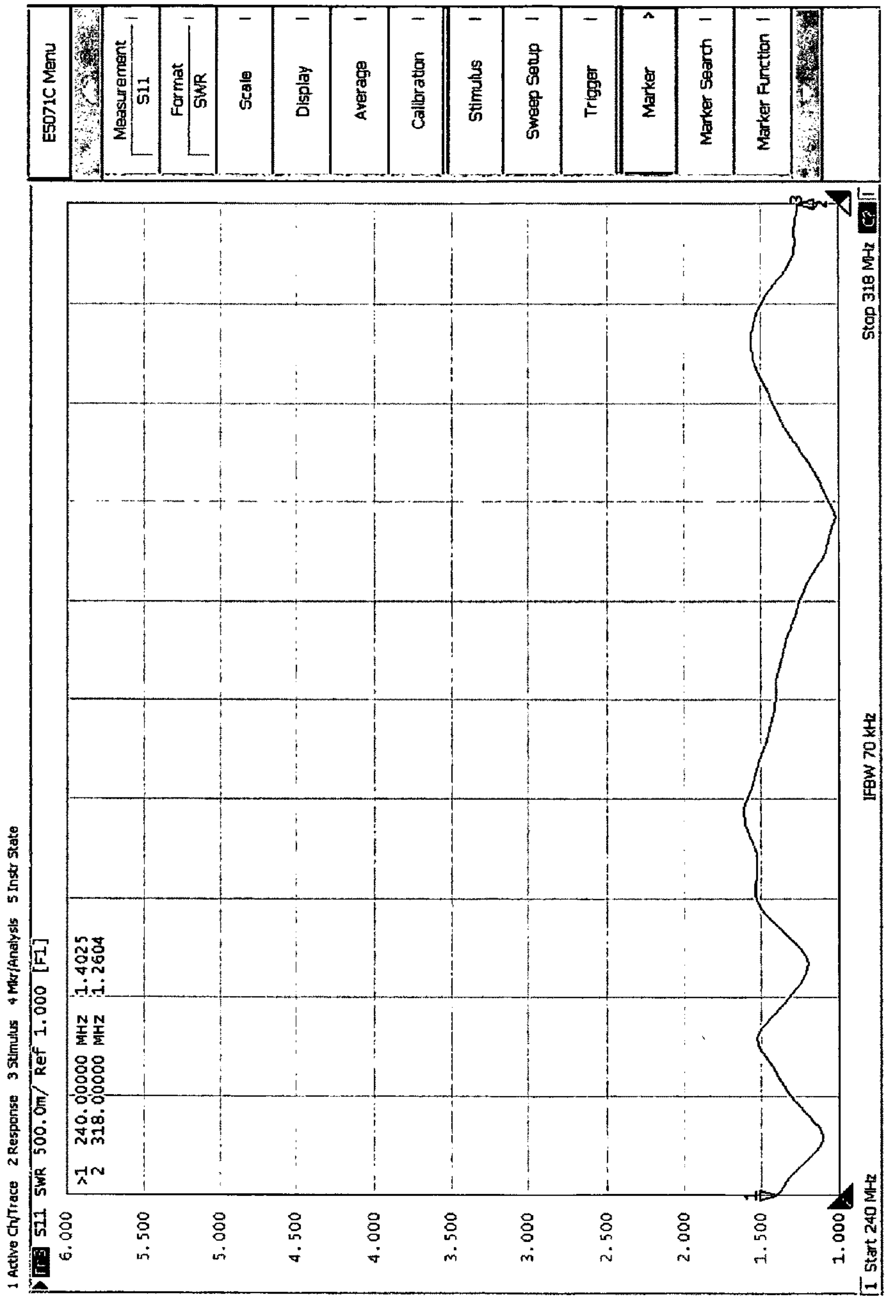
FIG. 14 is a graph showing a plot of VSWR versus frequency for the antenna of FIG. 2, as measured by the test set-up of FIG. 13.
Figure 15:
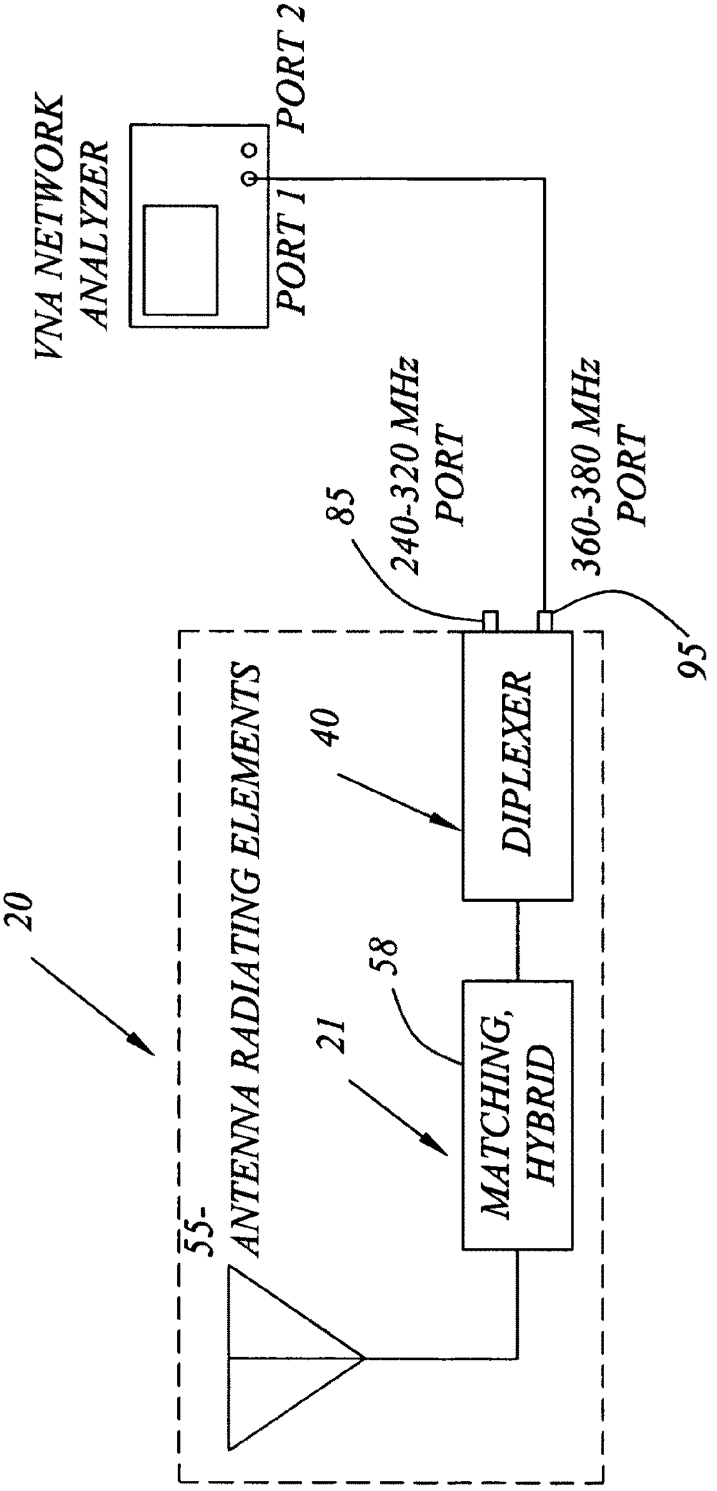
FIG. 15 is a block diagram showing a test set-up used to measure VSWR of the antenna of FIG. 2, for a frequency band of 360-380 megahertz.
Figure 16:
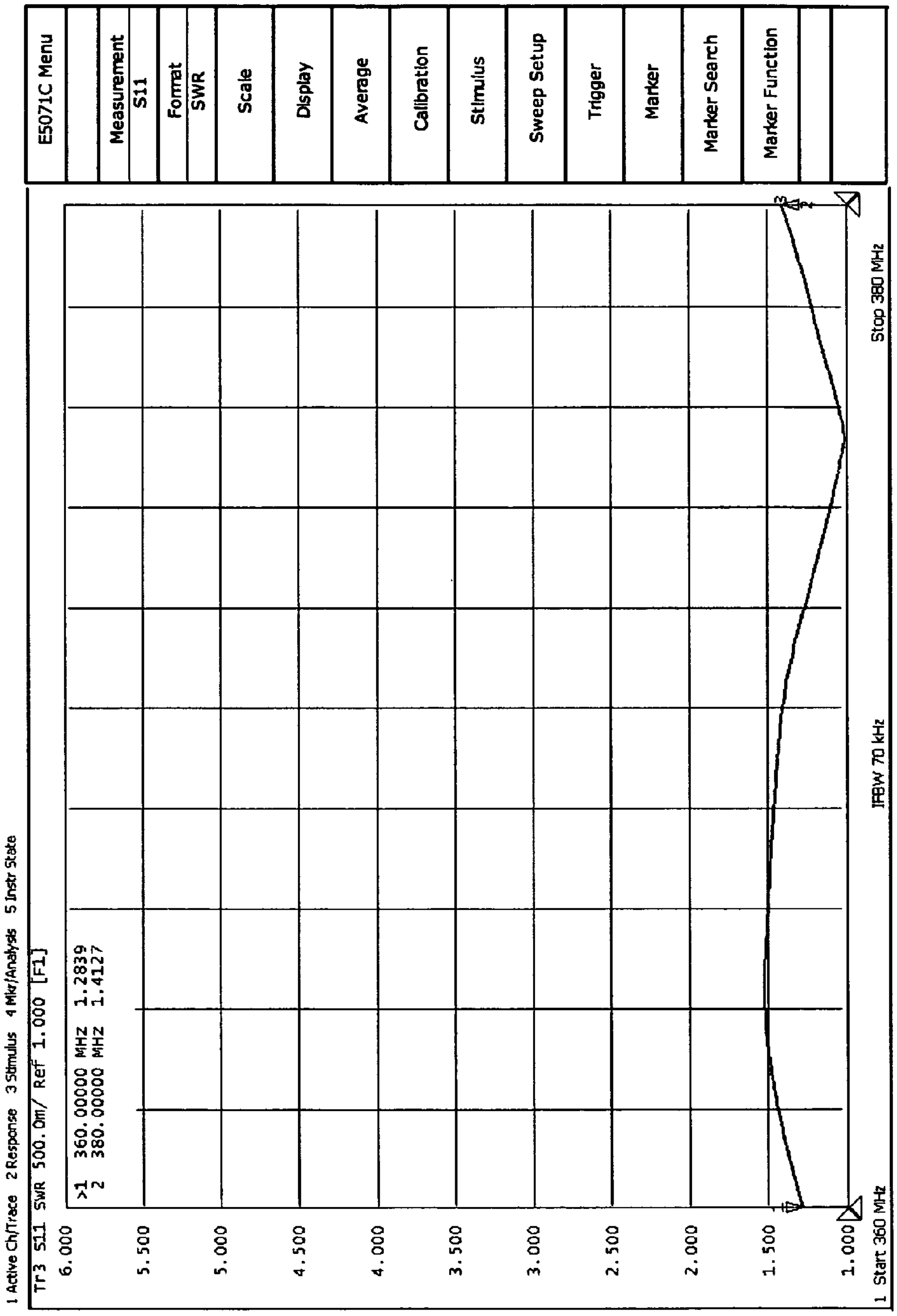
FIG. 16 is a graph showing a plot of VSWR versus frequency for the antenna of FIG. 2, as measured by the test set-up of FIG. 15.

FIGS. 13 and 15 illustrate test set-ups for measuring the Voltage Standing Wave Ratio (VSWR) of antenna 20, in low-frequency and high-frequency bands. FIGS. 14 and 16 are plots of VSWR versus frequency for antenna 20, as measured by the test set-ups of FIGS. 13 and 15, respectively.

What is claimed is:

1. A multi-band portable radio antenna comprising;

a. an antenna superstructure including:

i. an antenna superstructure support base including a housing having a front transversely disposed end plate, a longitudinally disposed body depending rearwardly from said front end plate, and a rear transversely disposed end plate, i.i. a tubular antenna mast protruding forward from said front end plate of said support base, i.i.i. at least a first radiating element assembly which protrudes radially outwards from said mast, iv. a first radio wave conducting guide connected at a distal end thereof to said first radiating element assembly, said first guide being disposed rearwardly from said first radiating element assembly, and v. an antenna matching network mounted to said support base, said antenna matching network having a first, zero-degree-phase output port electrically connected to a proximal end of said first guide, said antenna matching network having an input port electrically conductively coupled to an antenna base connector, and b. a diplexer mounted to a housing which extends longitudinally rearwards from said antenna superstructure base, said diplexer including;

i. a first, multi-band antenna interface port electrically conductively connected to a common high-potential diplexer terminal of first and second band-pass wave filters, said multi-band interface port being connected to a diplexer output connector, said diplexer output connector being electrically conductively connected to said antenna base connector, i.i. a first, low-frequency band-pass electrical wave filter having an output terminal connected to said common high-potential diplexer terminal and having an input terminal electrically conductively connected to a first, low-frequency band transceiver connector, and i.i.i. a second, high-frequency band-pass electrical wave filter having an output terminal connected to said common high-potential diplexer terminal and having an input terminal electrically conductively connected to a second, high-frequency transceiver connector.

2. The antenna of claim 1 wherein said diplexer housing has a longitudinally disposed outer peripheral surface which is parallel to a longitudinally disposed outer peripheral surface of said antenna superstructure base.

3. The antenna of claim 2 wherein said outer peripheral surfaces of said diplexer housing and said antenna superstructure base are coaxially aligned.

4. The antenna of claim 1 wherein said antenna base connector is mounted on said rear end plate of said antenna superstructure base.

5. The antenna of claim 4 wherein said diplexer output connector is located on a front end plate of said diplexer housing.

6. The antenna of claim 5 wherein said antenna base connector and said diplexer output connector are longitudinally alignable and engageable with each other.

7. The antenna of claim 6 wherein said antenna superstructure base connector and said diplexer output connector are complementary coaxial connectors.

8. The antenna of claim 7 including a clamp for retaining said diplexer housing in fixed relative longitudinal positions with said antenna superstructure base antenna and said diplexer output connector in mutual engagement.

9. The antenna of claim 8 wherein said clamp includes a ring which encircles and extends rearwardly from said antenna superstructure base, said ring being securable to said diplexer housing.

10. The antenna of claim 1 wherein said diplexer housing has protruding therefrom a superstructure support member for attachment to a support tripod.

11. The antenna of claim 1 wherein said low-frequency and high-frequency transceiver connectors are mounted on a rear end plate of said diplexer housing.

12. The antenna of claim 11 wherein said low-frequency and high-frequency connectors are coaxial connectors.

13. The antenna of claim 1 wherein said first radiating assembly is further defined as comprising a first pair of radially opposed radiating elements.

14. The antenna of claim 13 further including a second radiating assembly comprising a second pair of radially opposed radiating elements circumferentially spaced apart from said first pair of radiating elements.

15. The antenna of claim 14 further including a second radio wave conducting guide electrically conductively connected at a distal end thereof to said second radiating assembly, said second guide being disposed rearwardly from said second radiating assembly.

16. The antenna of claim 15 wherein said second guide is electrically conductively connected at a proximal end thereof to a second, ninety-degree phase port of said matching network.

17. The antenna of claim 16 wherein said first and second radio wave conducting guides are coaxial cables.

18. A multi-band portable radio antenna comprising;

a. an antenna superstructure including:

i. an antenna superstructure support base including a cylindrical housing having a front transversely disposed end plate, a longitudinally disposed body depending rearwardly from said front end plate, and a rear transversely disposed end plate, i.i. a tubular antenna mast protruding forward from said front end plate of said support base, i.i.i. a first radiating element assembly comprising a first pair of radially opposed radiating elements which protrude radially outwards from said mast, i.v. a second radiating element assembly comprising a second pair of radially opposed radiating elements spaced circumferentially apart from said first pair of radiating elements, v. first and second electrically conductive cables connected at distal ends thereof to said first and second radiating element assemblies, respectively, said first and second cables being disposed rearwardly through said mast from said first and second radiating element assemblies, and vi. an antenna matching network mounted to said support base, said antenna matching network having a first, zero-degree-phase output port electrically connected to a proximal end of said first cable, and a second, ninety-degree-phase output port connected to a proximal end of said second cable, said antenna matching network having an input port electrically conductively coupled to an antenna base connector, and b. a diplexer mounted in a housing which extends longitudinally rearwards from said antenna superstructure base, said diplexer including;

i. a first, multi-band antenna interface port electrically conductively connected to a common high-potential diplexer terminal of first and second band-pass wave filters, said multi-band interface port being connected to a diplexer output connector, said diplexer output connector being electrically conductively connected to said antenna base connector, i.i. a first, low-frequency band-pass electrical wave filter having an output terminal connected to said common high-potential diplexer terminal and having an input terminal electrically conductively connected to a first, low-frequency band transceiver connector, and i.i.i. a second, high-frequency band-pass electrical wave filter having an output terminal connected to said common high-potential diplexer terminal and having an input terminal electrically conductively connected to a second, high-frequency transceiver connector.

19. The antenna of claim 18 wherein said diplexer housing is removable from said antenna superstructure base.

20. The antenna of claim 19 wherein said diplexer output connector and said antenna base connector are mutually engageable coaxial connectors.

21. The antenna of claim 20 wherein said coaxial connectors are located on a rear side of said antenna superstructure and a front side of said diplexer housing, respectively.

22. The antenna of claim 21 wherein said transceiver connectors are located on a rear side of said diplexer housing.

* * * * *